(12) United States Patent
Maurer et al.

(10) Patent No.: US 7,097,208 B2
(45) Date of Patent: Aug. 29, 2006

(54) REINFORCED SPLASH GUARD

(76) Inventors: Richard Maurer, 13075 Portsmouth Dr., Carmel, IN (US) 46032; Donald P. Katz, 11067 Queens's Way Cir., Carmel, IN (US) 46032

( * ) Notice: Subject to any disclaimer, the term of this patent is extended or adjusted under 35 U.S.C. 154(b) by 0 days.

(21) Appl. No.: 10/205,561

(22) Filed: Jul. 25, 2002

(65) Prior Publication Data

US 2003/0030266 A1   Feb. 13, 2003

Related U.S. Application Data

(60) Provisional application No. 60/310,635, filed on Aug. 7, 2001.

(51) Int. Cl.
*B62D 25/16* (2006.01)
(52) U.S. Cl. .................. 280/851; 280/848; 280/847; 280/154; 280/152.3
(58) Field of Classification Search ............. 280/848, 280/851, 847, 154, 152.3, 850
See application file for complete search history.

(56) References Cited

U.S. PATENT DOCUMENTS

| | | | | |
|---|---|---|---|---|
| 3,521,903 A | * | 7/1970 | Rister | 280/851 |
| 4,382,606 A | * | 5/1983 | Lightle et al. | 280/851 |
| 4,398,739 A | * | 8/1983 | McKenzie et al. | 280/851 |
| 4,564,204 A | * | 1/1986 | Sullivan et al. | 280/851 |
| 4,585,243 A | * | 4/1986 | Lockwood et al. | 280/851 |
| 4,722,541 A | * | 2/1988 | Gray et al. | 280/851 |
| 5,080,397 A | * | 1/1992 | Metcalf | 280/851 |
| 5,120,082 A | * | 6/1992 | Ito | 280/851 |
| 5,582,430 A | * | 12/1996 | Bauer et al. | 280/851 |
| 5,829,775 A | * | 11/1998 | Maxwell et al. | 280/507 |
| 6,022,038 A | * | 2/2000 | Maxwell et al. | 280/507 |

FOREIGN PATENT DOCUMENTS

DE    3636909 A1 * 11/1987

* cited by examiner

*Primary Examiner*—J. Allen Shriver
(74) *Attorney, Agent, or Firm*—Maginot, Moore & Beck

(57) ABSTRACT

A splash guard for vehicles and for other applications. The splash guard has a splash guard body having a plurality of attachment holes extending therethrough, and a reinforcing structure, at least in the vicinity of the attachment holes for resisting tearing or cracking of the splash guard. The reinforcing structure includes one or both of thickened portions through which the attachment holes extend, and a reinforcing scrim embedded in the splash guard body.

11 Claims, 3 Drawing Sheets

REINFORCED SPLASH GUARD

This application claims the benefit of U.S. Provisional Patent Application Ser. No. 60/310,635 filed Aug. 7, 2001.

BACKGROUND OF THE INVENTION

1. Field of the Invention

The present invention relates generally to a splash guard; and, more particularly, to a reinforced splash guard for vehicles and for other applications.

2. Description of the Prior Art

As a vehicle travels on a roadway, rotation of the vehicle wheels can cause the wheels to throw water, ice, snow, mud, sand, rocks or other materials from the roadway. Such materials can be directed outwardly from the vehicle in various directions, and can produce annoying or dangerous conditions.

Splash guards are known and have been developed in an effort to reduce the splashing and spraying of liquids or slush or the like and the throwing of sand and rocks or the like from moving vehicles. Typically, splash guards hang down from the vehicle behind the vehicle wheels in order to catch the liquid, slush, rocks, etc. thrown by the wheels and to deflect the materials downwardly onto the roadway.

Usually, a splash guard is supported from a structure of the vehicle by a plurality of bolts, commonly four bolts, that extend through attachment holes formed adjacent the upper edge of the splash guard. Over a period of time, however, the splash guard tends to fatigue and weaken, particularly around the area of the attachment holes; and this can cause the splash guard to tear away from the bolts. Besides requiring replacement, the damaged splash guard can tear completely away from the vehicle while the vehicle is in use creating a significant risk of damage or injury.

Another problem that often occurs with many known splash guard designs is commonly referred to in the art as "sailing". Sailing is the tendency of a splash guard to swing or flap rearwardly during forward movement of the vehicle; and can result in uncovering at least part of the wheel, thus allowing liquid, slush, rocks, etc. to be thrown rearwardly from the vehicle without obstruction.

Efforts to reduce sailing of a splash guard often involve affixing rigid backing materials on the splash guard or inserting stiffening members in cavities formed by rolling the splash guard. These approaches, however, are generally not fully satisfactory because it is desirable that the splash guard retain sufficient flexiblity so as to be able to withstand impacts, cold temperatures or the like that can cause the splash guard to crack or break.

There is, accordingly, an important need for a splash guard for vehicles and for other applications that resists tearing or cracking; and that reduces the tendency of the splash guard to sail without excessively reducing the flexibility of the splash guard.

SUMMARY OF THE INVENTION

The present invention provides a splash guard for vehicles and for other applications that is reinforced in such a manner as to resist tearing or cracking of the splash guard; and, at the same time, that also significantly reduces sailing of the splash guard.

A splash guard according to the present invention includes a splash guard body, a plurality of attachment holes that extend through the splash guard body for attaching the splash guard to a supporting structure, and a reinforcing structure on the splash guard body, at least in the vicinity of the attachment holes, for resisting tearing or cracking of the splash guard.

The provision of a reinforcing structure on the splash guard provides the splash guard with an increased ability to resist cracking or tearing, particularly in the vicinity of the attachment holes; and, thus, reduces the risk of the splash guard tearing away from bolts or the like that extend through the attachment holes to attach the splash guard to the vehicle. At the same time, the reinforcing structure stabilizes the splash guard somewhat to resist the tendency of the splash guard to sail while keeping the splash guard sufficiently flexible to be able to effectively resist impacts, cold temperatures or the like. With the reinforcing structure of the present invention, even if the splash guard were to crack or tear, the cracking or tearing will tend not to be sudden but will be gradual over a period of time. As a result, it is likely that the driver of the vehicle, for example, will recognize the cracking or tearing and replace the splash guard before it is able to tear away from the vehicle.

According to one embodiment of the present invention, the splash guard comprises a plurality of thickened portions on the splash guard through which the attachment holes extend to reinforce the splash guard in the vicinity of the attachment holes. Preferably, the plurality of thickened portions comprise a plurality of narrow, thickened strips that are spaced from and parallel to one another and that extend vertically from the top edge of the splash guard to the bottom edge. With such a design, in addition to strengthening the splash guard, the narrow strips help to stabilize the splash guard so as to reduce sailing thereof, and, also, define vertical channels therebetween to assist in guiding liquid, slush, rocks, etc. downwardly toward the roadway. The design also permits the splash guard to be readily manufactured using common extrusion procedures.

According to other embodiments of the present invention, the reinforcing structure further includes a reinforcing scrim embedded within the splash guard body to additionally strengthen the splash guard and to further resist tearing or cracking of the splash guard. The reinforcing scrim can be embedded within the splash guard body only at the thickened portions, or it can be embedded throughout the splash guard body.

According to another embodiment of the present invention, the reinforcing structure comprises the reinforcing scrim alone, without providing the thickened portions on the splash guard. The reinforcing scrim can be embedded in the splash guard throughout the splash guard body, or only in the vicinity of the attachment holes.

A splash guard according to the present invention can be constructed of any appropriate plastic or rubber material, and can be formed in any standard or other desired size and configuration for use in numerous applications. The splash guard can also be manufactured by any suitable manufacturing procedure including extrusion or molding processes.

Yet further features and advantages of the present invention will become apparent hereinafter in conjunction with the following detailed description of presently preferred embodiments thereof

DETAILED DESCRIPTION OF PRESENTLY PREFERRED EMBODIMENTS OF THE INVENTION

Figure 1:
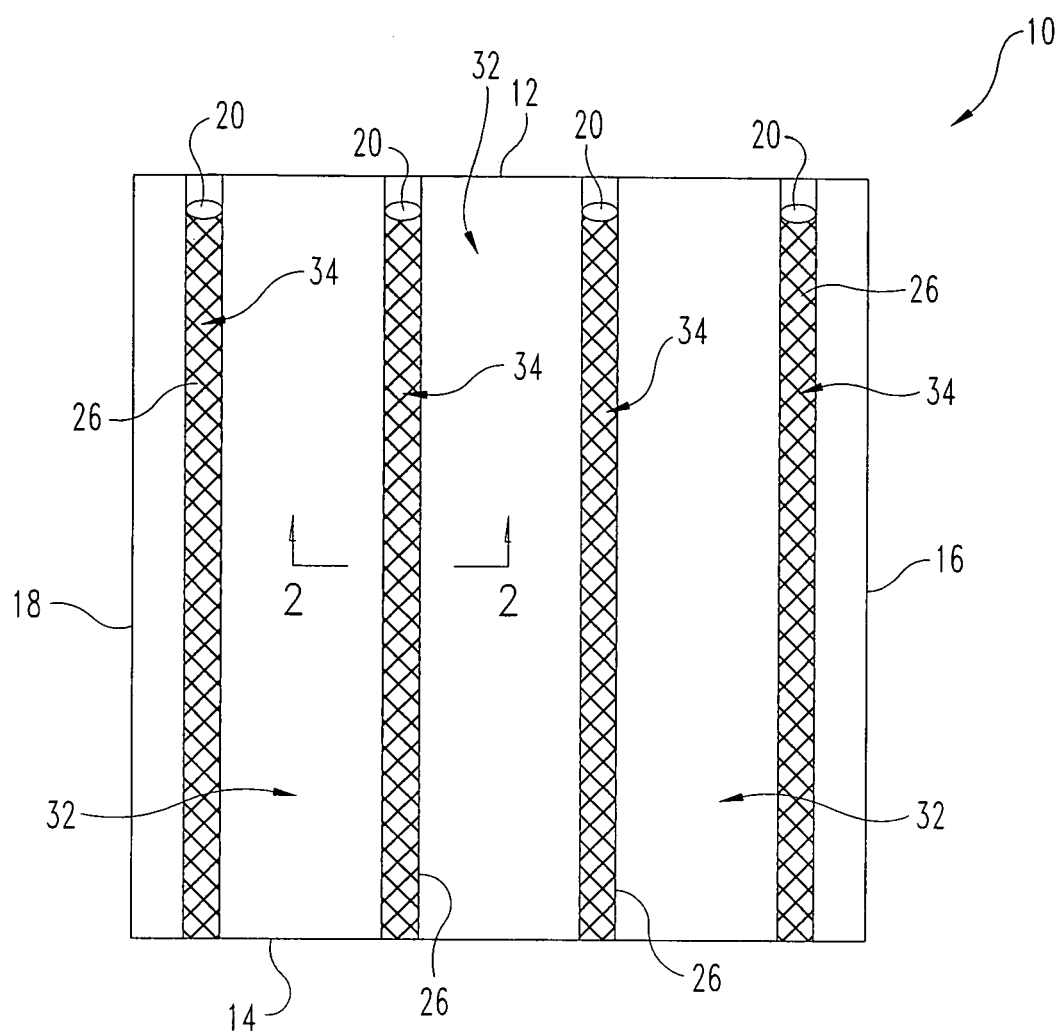
FIG. 1 is a schematic plan view of a splash guard according to a first embodiment of the present invention.

FIG. 1 is a schematic plan view of a splash guard for a truck or other vehicle, or for another application, according to a first presently preferred embodiment of the present invention. The splash guard is generally designated by reference number 10 and in the illustrated embodiment, comprises a rectangular-shaped member having top and bottom edges 12 and 14 and side edges 16 and 18. This rectangular shape, however, is intended to be exemplary only as the splash guard could also be square-shaped or of any other shape appropriate for a particular application. Splash guard 10 may be formed of rubber, plastic or any other suitable material as is known to those skilled in the art.

As is also known to those skilled in the art, splash guard 10 is adapted to hang down from the vehicle behind wheels thereof. Usually, this is accomplished by attaching the splash guard to a structure on the vehicle by extending a plurality of bolts through attachment holes formed in the splash guard and securing the bolts to the vehicle structure. Thus, as shown in FIG. 1, splash guard 10 includes four attachment holes 20 that are substantially equally spaced adjacent the top edge 12 of the splash guard.

During use, a splash guard is subjected to substantial stresses. Such stresses include stresses caused by flapping up and down during forward movement of the vehicle, stresses caused by cold temperatures, stresses caused by the accumulation of ice and/or snow on the splash guard, and stresses resulting from being impacted. Over a period of time, accordingly, the splash guard tends to fatigue and weaken, particularly around the attachment holes. Eventually, the splash guard may tear away from the supporting bolts and may fly off of the vehicle creating a substantial safety hazard.

According to the present invention, splash guard 10 includes a reinforcing structure to resist tearing and cracking of the splash guard, particularly in the areas surrounding the attachment holes 20. In the embodiment illustrated in FIG. 1, the reinforcing structure comprises a plurality of thickened portions 26 on the splash guard. The thickened portions 26, one of which is shown more clearly in the cross-sectional view of FIG. 2, comprise a plurality of spaced, parallel, narrow strips that extend vertically on the splash guard from the top edge 12 to the bottom edge 14 thereof. In addition, the thickened portions are positioned on the splash guard such that the attachment holes 20 extend through the thickened portions as shown in FIG. 1.

The thickened portions 26 strengthen and reinforce the splash guard around the vicinity of the attachment holes; and, accordingly, assist in resisting cracking or tearing of the splash guard in those areas where the splash guard is most susceptible to fatigue. Furthermore, by extending the full length of the splash guard from the top edge 12 to the bottom edge 14 thereof, the thickened portions function as stabilizing structures to stabilize the overall splash guard so as to reduce the tendency for the splash guard to sail; and, at the same time, the splash guard retains sufficient flexibility to resist stresses due to impacts or the like. Also, the thickened portions define channels 32 therebetween that help to guide liquids, slush, rocks, etc. downwardly toward the roadway According to one embodiment of the present invention, splash guard 10 has dimensions of 30 inches high by 24 inches wide. The attachment holes comprise oval-shaped holes about ⅜ inches wide, and the thickened portions comprise vertical strips approximately one and one-half inches wide. The main body of the splash guard is about 0.125 inches thick, while the thickened strips are about 0.375 inches thick. It should be understood, however, that these dimensions are intended to be exemplary only and can be widely varied without departing from the scope of the present invention.

Figure 2:
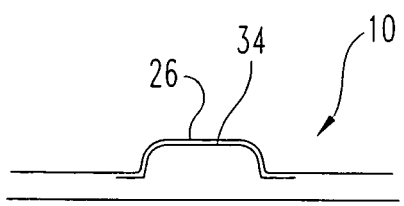
FIG. 2 is a cross-sectional view of the splash guard of FIG. 1 taken along the line 2—2 in FIG. 1.

As also illustrated in FIGS. 1 and 2, the reinforcing structure may additionally include a reinforcing scrim 34 embedded within the thickened portions 26 of the splash guard. The reinforcing scrim 34 can comprise threads of polypropylene or another appropriate material, and can be formed in any suitable pattern as will be described more fully hereinafter. The reinforcing scrim further reinforces the splash guard, particularly in the areas surrounding the attachment holes 20 to further resist tearing or cracking of the splash guard. As shown in FIG. 1, the reinforcing scrim preferably extends the full length of the thickened portions to facilitate manufacture of the splash guard by extrusion processes. The reinforcing scrim could also be provided only in the vicinity of the attachment holes, if desired, without departing from the scope of the present invention.

Figure 3:
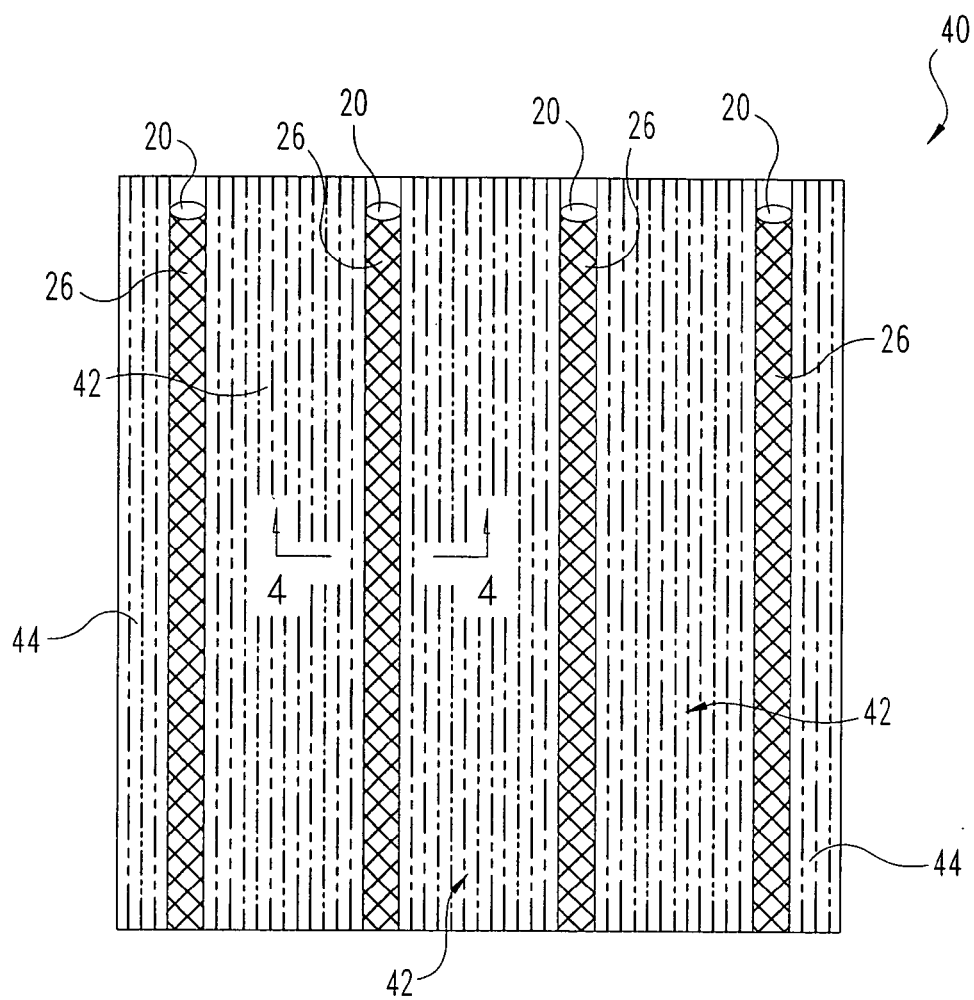
FIG. 3 is a schematic plan view of a splash guard according to a second embodiment of the present invention.
Figure 4:
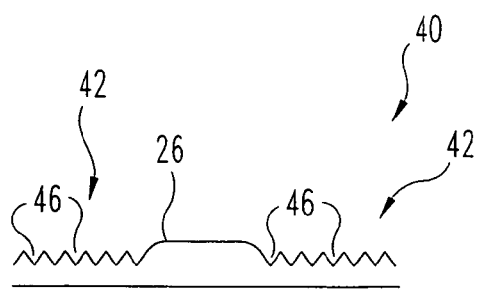
FIG. 4 is a cross-sectional view of the splash guard of FIG. 3 taken along the line 4—4 in FIG. 3.

FIGS. 3 and 4 schematically illustrate a splash guard 40 according to another embodiment of the present invention. In FIG. 3, the channels 42 between the thickened portions 26 of the splash guard, as well as the narrow portions 44 of the splash guard outside the outermost thickened portions, are provided with a ribbed construction. These ribbed areas provide troughs or grooves 46 therebetween for guiding liquid, slush, rocks, etc. downwardly toward the roadway so as to more effectively reduce splashing or spraying; and, in addition, further improve the anti-sailing properties of the splash guard. In a preferred embodiment of the invention, the ribs are of generally triangular cross-section as illustrated in FIG. 4, and have a thickness of 0.250 inches at the highest points of the ribs. The thickness of the grooves between the ribs is 0.125 inches. Thus, at the thickest parts of the ribs, the thickness of the splash guard is the same as the thickness of the thickened portions 26.

Figure 5:
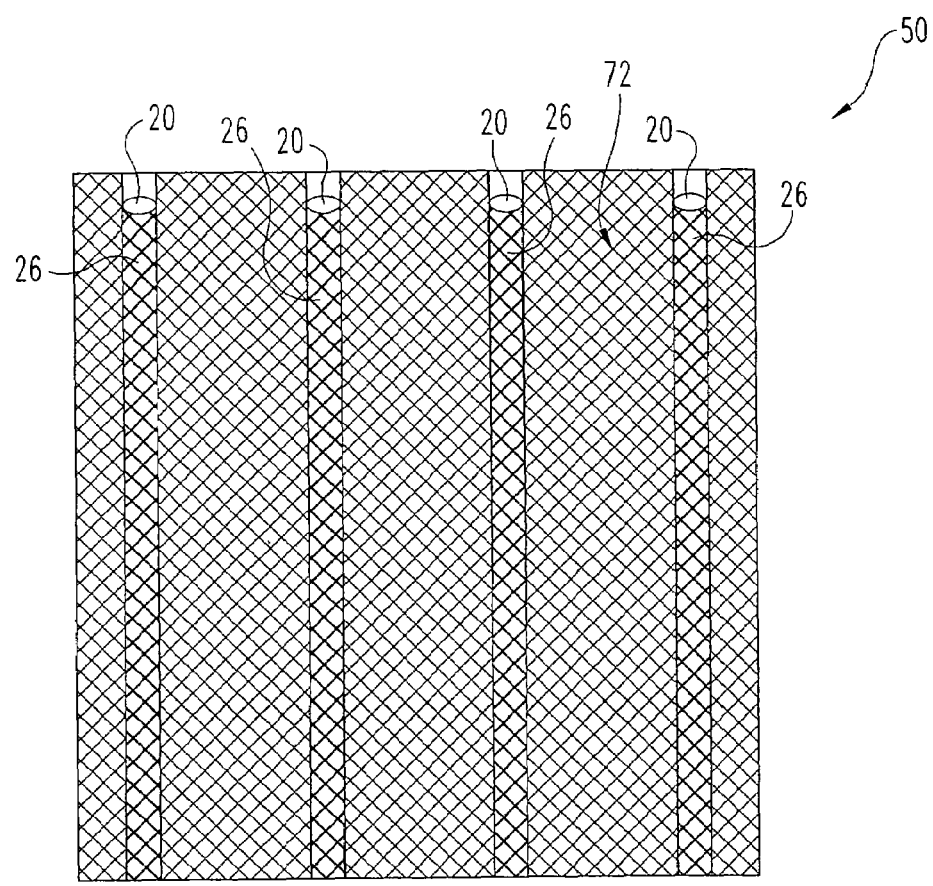
FIG. 5 is a schematic plan view of a splash guard according to a third embodiment of the present invention.

FIG. 5 schematically illustrates a splash guard 50 according to yet a further embodiment of the present invention. In the embodiment of FIG. 5, a reinforcing scrim 72 is embedded within the entire body of the splash guard. In this embodiment, the reinforcing scrim itself provides substantial protection against cracking or tearing of the splash guard. In this embodiment also, the splash guard may or may not include the thickened portions 26, and may or may not include the ribbed portions 42 shown in FIGS. 3 and 4.

The splash guard of the present invention can be manufactured by any appropriate manufacturing process including an extrusion process or a molding process. In an extrusion process, the reinforcing scrim is preferably incorporated into the splash guard body by applying the scrim onto a surface of the extruded body, and then passing the body through an embossing wheel which embeds the scrim slightly within the extruded body while it is in a heated and softened condition. The reinforcing scrim can be embedded in the splash guard adjacent either the front or rear surface of the splash guard, or it can be embedded near the center of the splash guard, if desired.

The reinforcing scrim can be made from any oriented or unoriented strength fiber such as polyester, any polyolefin or other man-made materials in the form of mono- or multi-filament yarn, slit film tape or extruded netting. Most preferably, the reinforcing material comprises a web of woven or non-woven scrim-like material extruded within the splash guard. The reinforcing material can be formed in a diamond pattern as illustrated in FIGS. 1 and 5, in a square or random pattern, or in any other suitable strength-producing pattern.

In general, the present invention provides a splash guard for vehicles and for other applications that is resistant to tearing or cracking, particularly in the area around the attachment holes through which the splash guard is attached to a vehicle or other structure. In various of the embodiments, the splash guard provides improved anti-splash and anti-sailing properties while maintaining the splash guard relatively flexible so as to avoid it's being easily damaged by impacts or the like. The splash guard of the present invention can be easily manufactured in any desired size or shape as needed for various applications. Generally, the reinforced splash guard according to the present invention will have a lengthened life span and will require replacement less frequently than current splash guards.

While what has been described herein constitutes presently preferred embodiments of the present invention, it should be recognized that the invention can be varied in many ways without departing from the scope thereof For example, although in embodiments described herein, the reinforcing scrim is described as being embedded in the splash guard body, it could also be applied to all or a portion of a surface of the body. Because the invention can be varied in many ways, it should be understood that the invention should limited only insofar as is required by the scope of the following claims.

The invention claimed is:

1. A splash guard comprising:
an extruded splash guard body;
a plurality of attachment holes extending through said splash guard body for attaching said splash guard to a supporting structure;
a reinforcing structure on said splash guard body for resisting tearing or cracking of said splash guard, said reinforcing structure including at least one thickened portion integrally extruded with said splash guard body and provided at least in the vicinity of said plurality of attachment holes, wherein said plurality of attachment holes extend through said at least one thickened portion;
wherein said at least one thickened portion includes a plurality of spaced thickened portions, and wherein said plurality of attachment holes extend through said plurality of spaced thickened portions.

2. The splash guard according to claim 1, wherein said reinforcing structure further includes a reinforcing scrim embedded in said splash guard body.

3. The splash guard according to claim 2, wherein said reinforcing scrim is embedded in said splash guard body only in each of said plurality of spaced thickened portions.

4. The splash guard according to claim 2, wherein said reinforcing scrim is embedded in said splash guard body throughout said splash guard body.

5. The splash guard according to claim 2, wherein said reinforcing scrim is embedded in said splash guard body adjacent a surface of said splash guard body.

6. The splash guard according to claim 1, wherein said plurality of attachment holes are adjacent a top edge of said splash guard body, and wherein each of said plurality of attachment holes extends through a different one of said plurality of spaced thickened portions.

7. The splash guard according to claim 6, wherein the width of each of said plurality of spaced thickened portions is slightly greater than the width of each of said plurality of attachment holes.

8. The splash guard according to claim 1, wherein said plurality of spaced thickened portions extend from a top end to a bottom end of said splash guard body.

9. The splash guard according to claim 8, wherein said plurality of spaced thickened portions define channels therebetween for directing materials downwardly.

10. The splash guard according to claim 9, and further including a ribbed pattern in said channels.

11. The splash guard according to claim 10, wherein said ribbed pattern defines a plurality of vertical grooves for directing materials downwardly.

* * * * *